United States Patent
Wu et al.

(10) Patent No.: US 8,132,028 B2
(45) Date of Patent: Mar. 6, 2012

(54) MOTHERBOARD AND POWER SUPPLY MODULE THEREOF

(75) Inventors: Jiang-Shin Wu, Taipei (TW); En-Li Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 842 days.

(21) Appl. No.: 12/135,216

(22) Filed: Jun. 9, 2008

(65) Prior Publication Data
US 2009/0019295 A1    Jan. 15, 2009

(30) Foreign Application Priority Data
Jul. 9, 2007 (TW) ................................ 96124872 A

(51) Int. Cl.
*G06F 1/00* (2006.01)
(52) U.S. Cl. ........................................ 713/300; 323/351
(58) Field of Classification Search .......... 713/300–340; 323/351
See application file for complete search history.

(56) References Cited

U.S. PATENT DOCUMENTS

| | | | |
|---|---|---|---|
| 6,525,599 B2* | 2/2003 | Nguyen et al. | 327/544 |
| 6,691,235 B1 | 2/2004 | Garcia et al. | |
| 6,697,952 B1* | 2/2004 | King | 713/300 |
| 7,043,648 B2 | 5/2006 | Tokunaga | |
| 7,684,246 B2* | 3/2010 | Jeong et al. | 365/185.18 |
| 2004/0030936 A1* | 2/2004 | Wang et al. | 713/300 |
| 2008/0111534 A1* | 5/2008 | Ravichandran | 323/351 |

* cited by examiner

*Primary Examiner* — Thomas Lee
*Assistant Examiner* — Xuxing Chen
(74) *Attorney, Agent, or Firm* — Jianq Chyun IP Office

(57) ABSTRACT

A motherboard and a power supply module thereof are disclosed. The power supply module provided by the invention can be directly fixed on a motherboard supporting an AM2 CPU and an AM2+ CPU. The power supply module provided by the invention utilizes a switching unit to switch between a group of pulse width modulation (PWM) signals for generating core voltages needed by an AM2 CPU and another PWM signal for generating a core voltage needed by an AM2+ CPU according to a version signal provided by the CPU of the motherboard. Therefore, no matter a CPU socket of the motherboard receives the AM2 CPU or the AM2+ CPU, the power supply module of the invention can obtain the maximum usage efficiency thereof, and the manufacture cost of motherboard with the power supply module decreases.

14 Claims, 4 Drawing Sheets

MOTHERBOARD AND POWER SUPPLY MODULE THEREOF

CROSS-REFERENCE TO RELATED APPLICATION

This application claims the priority benefit of Taiwan application serial no. 96124872, filed on Jul. 9, 2007. The entirety of the above-mentioned patent application is hereby incorporated by reference herein and made a part of specification.

BACKGROUND OF THE INVENTION

1. Field of the Invention

The invention relates to a power supply technology and, more particularly to a power supply module applied to a motherboard supporting an AM2 CPU and an AM2+ CPU.

2. Description of the Related Art

On a motherboard supporting an AM2 CPU and an AM2+ CPU, when a central processing unit (CPU) socket on the motherboard receives an AM2 CPU, a power supply module on the motherboard should supply a group of core voltages for the AM2 CPU. When the CPU socket on the motherboard receives an AM2+ CPU, the power supply module on the motherboard should provide two groups of core voltages with different voltage levels for the AM2+ CPU.

FIG. 1 is a block diagram showing a system for providing a core voltage for a CPU in a conventional motherboard 100 supporting an AM2 CPU and an AM2+ CPU. As shown in FIG. 1, a power supply module 101 is directly fixed on the motherboard 100, and a CPU 103 is installed on the CPU socket (not shown) of the motherboard 100. According to the version of the CPU 103, the power supply module 101 is controlled by the CPU 103 to provide a corresponding core voltage $V_{DD\_CORE}$ or provide a corresponding core voltage $V_{DD\_CORE}$ and a corresponding core voltage $V_{DD\_NB}$ for the CPU 103.

If the CPU 103 is an AM2 CPU, and the CPU 103 can provide a version signal VS for the power supply module 101 when the CPU 103 operates. Then, the power supply module 101 can provide a group of core voltages $V_{DD\_CORE}$ for the AM2 CPU 103. If the CPU 103 is an AM2+ CPU, and the CPU 103 can provide another version signal VS for the power supply module 101 when the CPU 103 operates. Then, the power supply module 101 can provide the core voltage $V_{DD\_CORE}$ and the core voltage $V_{DD\_NB}$ for the AM2+ CPU 103.

The circuit configuration of the conventional power supply module 101 generally includes a pulse width modulation (PWM) controller 105 and five groups of voltage generation units 107a to 107e. The PWM controller 105 can generate PWM signals PWM_CORE1 to PWM_CORE4 and determine whether to generate a PWM signal PWM_NB according to the version signal VS provided by the CPU 103. When the voltage generation units 107a to 107e receive their corresponding PWM signals PWM_CORE1 to PWM_CORE4 and PWM_NB, they output the corresponding core voltages $V_{DD\_CORE}$ and the corresponding core voltage $V_{DD\_NB}$ to the CPU 103.

For example, if the CPU 103 is an AM2 CPU, the CPU 103 allows the PWM controller 105 to output the PWM signals PWM_CORE1 to PWM_CORE4, and the CPU 103 can provide a version signal VS for the PWM controller 105 to allow the PWM controller 105 not to generate the PWM signal PWM_NB. Then, the voltage generation units 107a to 107d can correspondingly receive the PWM signals PWM_CORE1 to PWM_CORE4 to provide the core voltages $V_{DD\_CORE}$ for the AM2 CPU 103.

If the CPU 103 is an AM2+ CPU, the CPU 103 allows the PWM controller 105 to output the PWM signals PWM_CORE1 to PWM_CORE4, and the CPU 103 can provide another version signal VS for the PWM controller 105 to allow the PWM controller 105 to generate the PWM signal PWM_NB. Then, the voltage generation units 107a to 107e can correspondingly receive the PWM signals PWM_CORE1 to PWM_CORE4 and PWM_NB to provide the core voltages $V_{DD\_CORE}$ and the core voltage $V_{DD\_NB}$ for the AM2+ CPU 103 at the same time.

BRIEF SUMMARY OF THE INVENTION

The invention provides a power supply module, and a switching unit is utilized to switch according to a version signal provided by a central processing unit (CPU) of a motherboard, and then the power supply module provided by the invention has the maximum usage efficiency.

The invention provides a motherboard, and the power supply module of the invention is directly fixed in the motherboard to decrease the manufacture cost of the motherboard.

The power supply module provided by the invention is applied to a motherboard supporting an AM2 CPU and an AM2+ CPU. The power supply module includes a pulse width modulation (PWM) controller, a first voltage generation unit, a switching unit and a second voltage generation unit. The PWM controller is controlled by the CPU of the motherboard. When the CPU operates, the PWM controller outputs a first PWM signal and a second PWM signal and determines whether to output a third PWM signal according to a state of a version signal provided by the CPU.

The first voltage generation unit provides a first core voltage for the CPU according to the first PWM signal outputted by the PWM controller. The switching unit allows one of the second PWM signal and the third PWM signal outputted by the PWM controller to be output according to the state of the version signal provided by the CPU. The second voltage generation unit correspondingly provides the first core voltage or a second core voltage for the CPU according to the output of the switching unit.

In one embodiment of the invention, the state of the version signal provided by the CPU is mostly determined by the version of the CPU.

In one embodiment of the invention, when the CPU is an AM2 CPU, the state of the version signal provided by the CPU is a floating level to allow the PWM controller to stop outputting the third PWM signal and allow the switching unit to output the second PWM signal.

In one embodiment of the invention, when the CPU is an AM2+ CPU, the state of the version signal provided by the CPU is a low level to allow the switching unit to output the third PWM signal.

In one embodiment of the invention, the switching unit includes a first transistor, a second transistor, a third transistor and a fourth transistor. The gate electrode of the first transistor is used for receiving the version signal provided by the CPU, a first drain/source electrode of the first transistor is coupled to the system voltage of the motherboard, and a second drain/source electrode of the first transistor is coupled to a reference voltage. A gate electrode of the second transistor is coupled to the first drain/source electrode of the first transistor, a first drain/source electrode of the second transistor is used for receiving the second PWM signal outputted by the PWM controller, and a second drain/source electrode of the second transistor is coupled to the reference voltage.

A gate electrode of the third transistor is coupled to the first drain/source electrode of the first transistor, a first drain/source electrode of the third transistor is coupled to the system voltage of the motherboard, and a second drain/source electrode of the third transistor is coupled to the reference voltage. A gate electrode of the fourth transistor is coupled to the first drain/source electrode of the third transistor, a first drain/source electrode of the fourth transistor is used for receiving the third PWM signal outputted by the PWM controller and is coupled to the second voltage generation unit. A second drain/source electrode of the fourth transistor is coupled to the first drain/source electrode of the second transistor.

In one embodiment of the invention, the switching unit further includes a first resistance, a second resistance, a third resistance and a fourth resistance. The first resistance is coupled between a memory voltage of the motherboard and the gate electrode of the first transistor. The second resistance is coupled between the system voltage of the motherboard and the first drain/source electrode of the first transistor. The third resistance is coupled between the first drain/source electrode of the first transistor and the reference voltage. The fourth resistance is coupled between the system voltage of the motherboard and the first drain/source electrode of the third transistor.

In one embodiment of the invention, when the state of the version signal provided by the CPU is the floating level, the first transistor and the fourth transistor are turned on, and the second transistor and the third transistor are turned off, and then the first drain/source electrode of the fourth transistor outputs the second PWM signal. When the state of the version signal provided by the CPU is the low level, the first transistor and the fourth transistor are turned off, and the second transistor and the third transistor are turned on, and then the first drain/source electrode of the fourth transistor outputs the third PWM signal.

In one embodiment of the invention, each of the first transistor, the second transistor, the third transistor and the fourth transistor is a N-channel metal oxide semiconductor field effect transistor (MOSFET).

In one embodiment of the invention, the PWM controller is further used to output a fourth PWM signal and a fifth PWM signal. The power supply module further includes a third voltage generation unit and a fourth voltage generation unit. The third voltage generation unit provides the first core voltage for the CPU according to the fourth PWM signal outputted by the PWM controller. The fourth voltage generation unit provides the first core voltage for the CPU according to the fifth PWM signal outputted by the PWM controller.

The invention provides a motherboard having the power supply module provided by the invention, and the motherboard supports both an AM2 CPU and an AM2+ CPU.

The power supply module provided by the invention can be directly fixed on the motherboard supporting an AM2 CPU and an AM2+ CPU. The power supply module provided by the invention mostly utilizes the switching unit to switch between a group of PWM signals for generating the core voltage needed by the AM2 CPU and the PWM signal for generating the core voltage needed by the AM2+ CPU according to the version signal provided by the CPU of the motherboard. Therefore, no matter a CPU socket on the motherboard is used for receiving the AM2 CPU or the AM2+ CPU, the power supply module provided by the invention can obtain the maximum usage efficiency, and the manufacture cost of the motherboard supporting an AM2 CPU and an AM2+ CPU and having the power supply module also decreases.

To make the technology features of the power supply module and the motherboard of the invention be better understood, a plurality of embodiments of the invention are illustrated with the accompanying drawings.

DETAILED DESCRIPTION OF THE EMBODIMENTS

When an AM2+ central processing unit (CPU) operates, a power supply module of a motherboard should provide two groups of core voltages with different voltage levels. When an AM2 CPU operates, the power supply module of the motherboard only needs to provide a group of core voltages, and a device for providing another group of core voltages in the power supply module is in an idle state. Therefore, a power supply module of a conventional motherboard supporting an AM2 CPU and an AM2+ CPU cannot obtain the maximum usage efficiency, and the manufacture cost of the motherboard is also caused to increase. The invention provides a power supply module to solve the problem of the power supply module of the conventional motherboard supporting an AM2 CPU and an AM2+ CPU.

Figure 1:
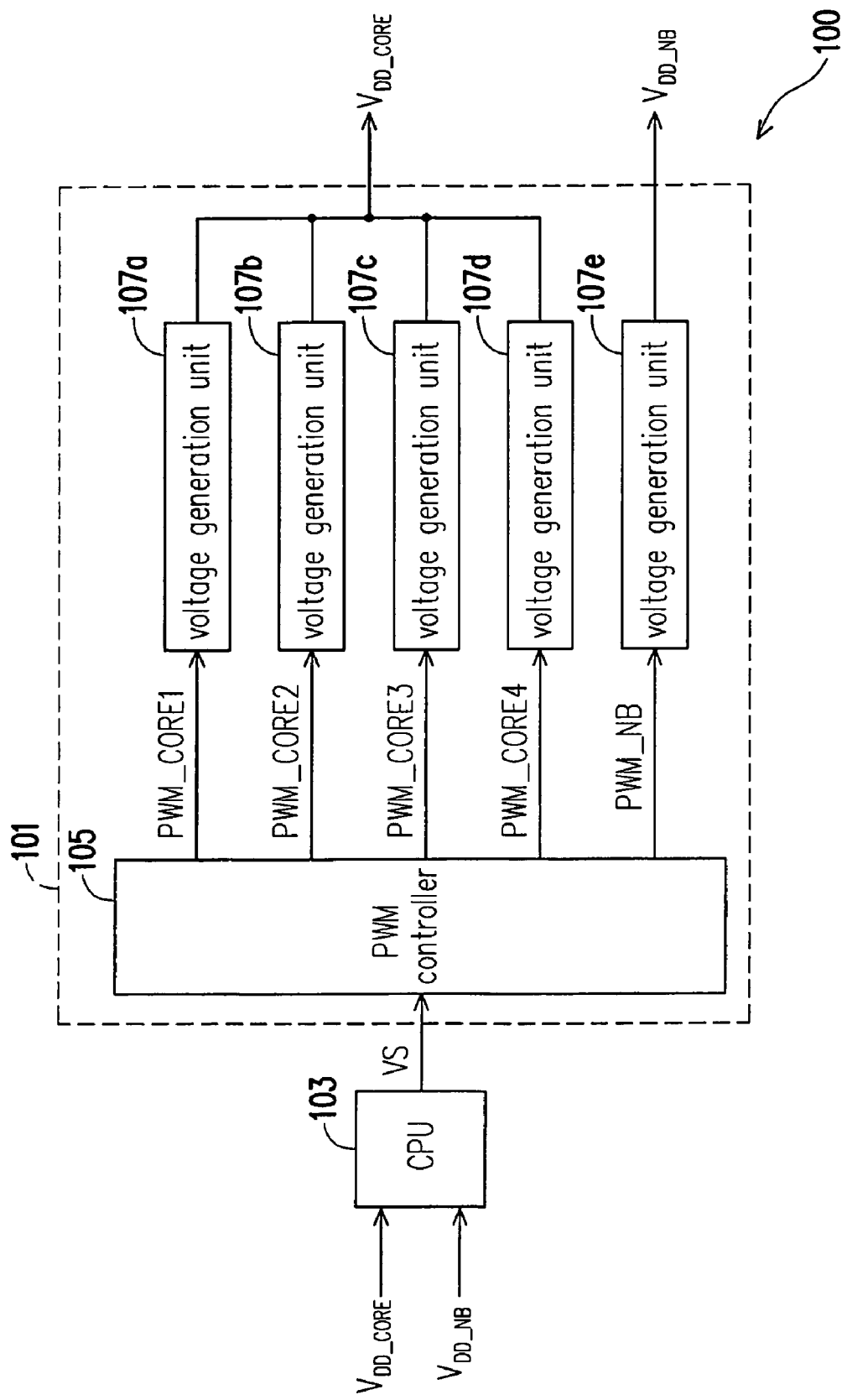
FIG. 1 is a block diagram showing a system for providing a core voltage for a central processing unit (CPU) in a conventional motherboard supporting an AM2 CPU and an AM2+ CPU.
Figure 2:
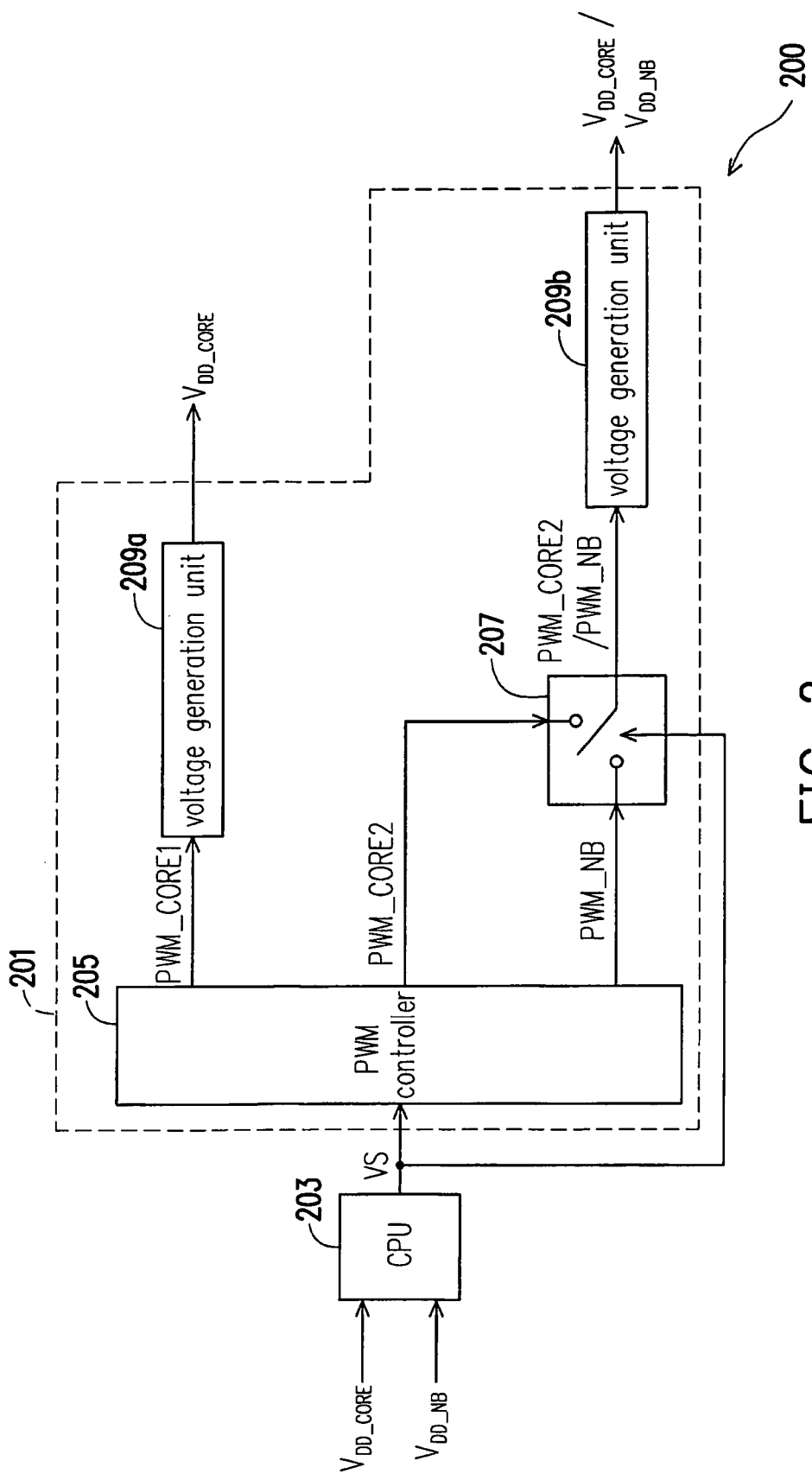
FIG. 2 is a block diagram showing a system for providing a core voltage for a CPU in a motherboard supporting an AM2 CPU and an AM2+ CPU according to one embodiment of the invention.

FIG. 2 is a block diagram showing a system for providing a core voltage for a CPU in a motherboard 200 supporting an AM2 CPU and an AM2+ CPU according to one embodiment of the invention. As shown in FIG. 2, the motherboard 200 includes a power supply module 201 and a CPU 203, and the power supply module 201 includes a pulse width modulation (PWM) controller 205, a switching unit 207 and two groups of voltage generation units 209a and 209b. The PWM controller 205 is controlled by the CPU 203. When the CPU 203 operates, the PWM controller 205 is used for outputting a first PWM signal PWM_CORE1 and a second PWM signal PWM_CORE2 and determining whether to output a third PWM signal PWM_NB according to the state of a version signal VS provided by the CPU 203.

The voltage generation unit 209a can provide a first core voltage $V_{DD\_CORE}$ for the CPU 203 according to the first PWM signal PWM_CORE1 outputted by the PWM controller 205. The switching unit 207 allows one of the second PWM signal PWM_CORE2 and the third PWM signal PWM_NB outputted by the PWM controller 205 to be outputted according to the state of the version signal VS provided by the CPU 203. The voltage generation unit 209b can correspondingly provide the first core voltage $V_{DD\_CORE}$ or a second core voltage $V_{DD\_NB}$ for the CPU 203 according to the output of the switching unit 207.

A pin for receiving the second core voltage $V_{DD\_NB}$ of the AM2+ CPU is corresponding to a pin for receiving the first core voltage $V_{DD\_CORE}$ of the AM2 CPU.

In the embodiment, the state of the version signal VS provided by the CPU 203 is determined by the version of the CPU 203. When the CPU 203 is an AM2 CPU, the state of the version signal VS provided by the CPU 203 is a floating level to allow the PWM controller 205 to stop outputting the third PWM signal PWM_NB and allow the switching unit 207 to output the second PWM signal PWM_CORE2. When the CPU 203 is an AM2+ CPU, the state of the version signal VS provided by the CPU 203 is a low level to allow the switching unit 207 to output the third PWM signal PWM_NB.

If a CPU socket (not shown) of the motherboard 200 is used for receiving the AM2 CPU 203, the AM2 CPU 203 allows the PWM controller 205 to output the first PWM signal PWM_CORE1 and the second PWM signal PWM_CORE2 and provides a version signal VS whose state is the floating level for the PWM controller 205 to allow the PWM controller 205 to stop generating the PWM signal PWM_NB. Then, the AM2 CPU 203 can provide the version signal VS for the switching unit 207 to control the switching unit 207 to output the second PWM signal PWM_CORE2 at the same time.

In this way, the voltage generation unit 209a and the voltage generation unit 209b can correspondingly receive the PWM signals PWM_CORE1 and PWM_CORE2 and provide the first core voltage $V_{DD\_CORE}$ for the AM2 CPU 203. Therefore, all circuit components in the power supply module 201 can obtain the maximum usage efficiency.

If the CPU socket of the motherboard 200 is used for receiving the AM2+ CPU 203, the AM2+ CPU 203 allows the PWM controller 205 to output the first PWM signal PWM_CORE1 and the second PWM signal PWM_CORE2 and provides the version signal VS whose state is the low level to the PWM controller 205 to allow the PWM controller 205 to generate the PWM signal PWM_NB. Then, the AM2+ CPU 203 can provide the version signal VS for the switching unit 207 to control the switching unit 207 to output the third PWM signal PWM_NB at the same time.

In this way, the voltage generation unit 209a and the voltage generation unit 209b can correspondingly receive the PWM signals PWM_CORE1 and PWM_NB and provide the first core voltage $V_{DD\_CORE}$ and the second core voltage $V_{DD\_NB}$ for the AM2+ CPU 203. Therefore, all circuit components in the power supply module 201 can obtain the maximum usage efficiency. No matter the CPU socket of the motherboard receives the AM2 CPU 203 or the AM2+ CPU 203, the power supply module 201 of the embodiment can obtain the maximum usage efficiency further to decrease the manufacture cost of the motherboard 200.

To obtain the technology efficiency of the power supply module 201 of the embodiment, the key technology of the power supply module 201 of the embodiment is that how to use the version signal VS provided by the AM2 CPU 203 or the AM2+ CPU 203 to control the output of the switching unit 207. An implementing mode of the switching unit 207 is illustrated hereinbelow for persons having ordinary skill in the art, but it is not used for limiting the scope of the invention.

Figure 3:
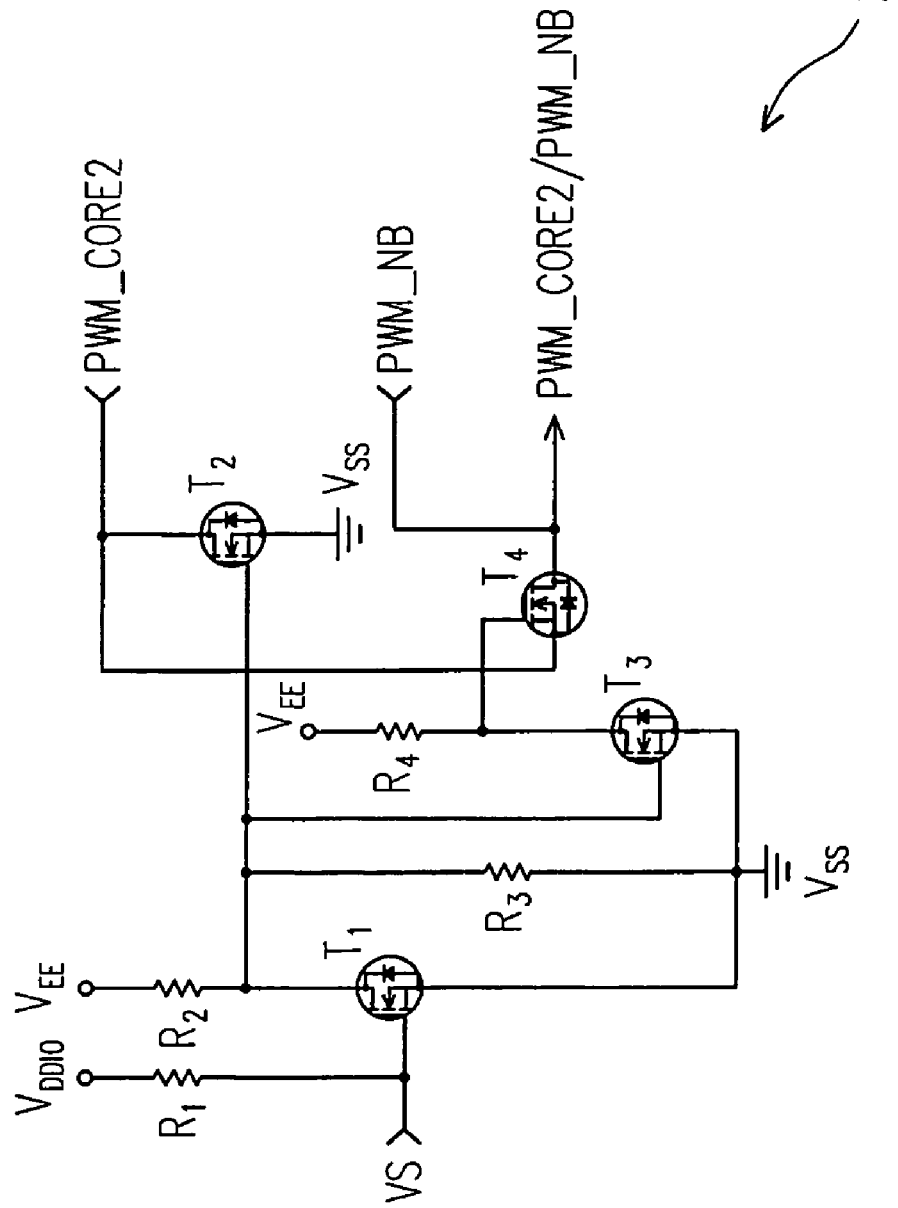
FIG. 3 is a schematic diagram showing the internal circuit of a switching unit in FIG. 2.

FIG. 3 is a schematic diagram showing the internal circuit of the switching unit 207 in FIG. 2. As shown in FIG. 2 and FIG. 3, the switching unit 207 includes transistors $T_1$ to $T_4$ (for example, each of the transistors is an N-channel metal oxide semiconductor field effect transistor (MOSFET)) and resistances $R_1$ to $R_4$. The gate electrode of the transistor $T_1$ is used for receiving the version signal VS provided by the CPU 203. A first drain/source electrode of the transistor $T_1$ is coupled to a system voltage $V_{EE}$ (such as 12V) of the motherboard 200 via the resistance $R_2$, and a second drain/source electrode of the transistor $T_1$ is coupled to a reference voltage $V_{SS}$ (such as a ground level). The gate electrode of the transistor $T_2$ is directly coupled to the first drain/source electrode of the transistor $T_1$, a first drain/source electrode of the second transistor $T_2$ is used for receiving the second PWM signal PWM_CORE2 outputted by the PWM controller 205, and a second drain/source electrode of the transistor $T_2$ is coupled to the reference voltage $V_{SS}$.

The gate electrode of the transistor $T_3$ is directly coupled to the first drain/source electrode of the transistor $T_1$, a first drain/source electrode of the transistor $T_3$ is coupled to the system voltage $V_{EE}$ of the motherboard 200 via the resistance $R_4$, and a second drain/source electrode of the Transistor $T_3$ is coupled to the reference voltage $V_{SS}$. The gate electrode of the transistor $T_4$ is directly coupled to the first drain/source electrode of the third transistor $T_3$, a first drain/source electrode of the transistor $T_4$ is directly coupled to the first drain/source electrode of the transistor $T_2$, and a second drain/source electrode of the transistor $T_4$ is used for receiving the third PWM signal PWM_NB outputted by the PWM controller 205 and is coupled to the voltage generation unit 209b. The resistance $R_1$ is coupled between a memory voltage $V_{DDIO}$ (such as 2V) of the motherboard 200 and the gate electrode of the transistor $T_1$, and the resistance $R_3$ is coupled between the first drain/source electrode of the transistor $T_1$ and the reference voltage $V_{SS}$.

As shown in FIG. 3, when the CPU 203 is an AM2 CPU, the state of the version signal VS provided by the CPU 203 is the floating level, and then the PWM controller 205 is allowed to stop outputting the third PWM signal PWM_NB. In this way, the gate electrode of the transistor $T_1$ can receive the memory voltage $V_{DDIO}$ of the motherboard 200 to allow the transistor $T_1$ to be turned on, and then the levels of the first and second drain/source electrodes of the transistor $T_1$ are ground levels. Thus, the transistors $T_2$ and $T_3$ are turned off. The gate electrode of the transistor $T_4$ receives the system voltage $V_{EE}$ of the motherboard 200 to allow the transistor $T_4$ to be turned on. Therefore, the first drain/source electrode of the transistor $T_4$ receives the second PWM signal PWM_CORE2 outputted by the PWM controller 205, and the second PWM signal PWM_CORE2 is outputted to the voltage generation unit 209b via the second drain/source electrode of the transistor $T_4$.

When the CPU 203 is an AM2+ CPU, the state of the version signal VS provided by the CPU 203 is the low level. In this way, the gate electrode of the transistor $T_1$ receives the version signal VS whose state is the low level to allow the transistor $T_1$ to be turned off, and then the transistors $T_2$ and $T_3$ are turned on. The levels of the first and second drain/source electrodes of the transistor $T_3$ are ground levels, and then the transistor $T_4$ is turned off. Therefore, the first drain/source electrode of the transistor $T_4$ receives the third PWM signal PWM_NB outputted by the PWM controller 205, and the third PWM signal PWM_NB is outputted to the voltage generation unit 209b. The circuit configuration shown in FIG. 3 can control the output of the switching unit 207 according to the version signal VS provided by the CPU 203, and then the technology efficiency of the power supply module 201 of the above embodiment can be obtained.

In the above embodiment, the power supply module 201 having two groups of voltage generation units 209a and 209b is taken as an example. Persons having ordinary skill in the art should know that if the voltage generation units 209a and 209b are used to supply the core voltage needed by the CPU 203 only, the voltage generation units 209a and 209b may be burned after they operates for a long time, and the power supply module 201 is caused to fail.

A motherboard supporting an AM2 CPU and an AM2+ CPU according to another embodiment of the invention is illustrated hereinbelow, and the motherboard can prolong the lifespan of the power supply module 201 of the above embodiment.

Figure 4:
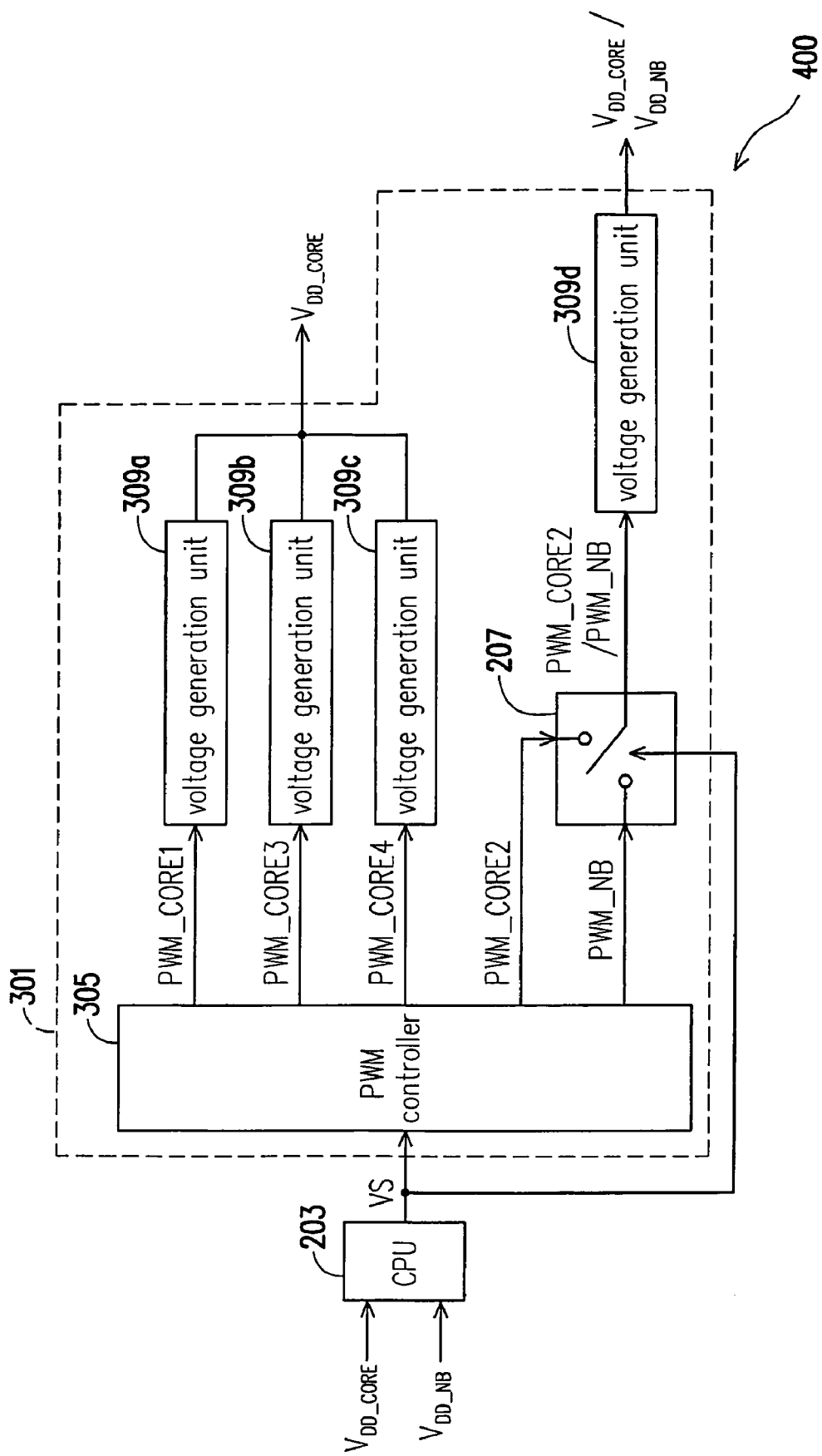
FIG. 4 is a block diagram showing a system for providing a core voltage for a CPU in a motherboard supporting an AM2 CPU and an AM2+ CPU according to another embodiment of the invention.

FIG. 4 is a block diagram showing a system for providing a core voltage for a CPU in a motherboard 400 supporting an AM2 CPU and an AM2+ CPU according to another embodiment of the invention. As shown in FIG. 2 to FIG. 4, the motherboard 400 is similar to the motherboard 200, and the difference between them is that a PWM controller 305 of a power control module 301 of the motherboard 400 can further output fourth and fifth PWM signals PWM_CORE3 and PWM_CORE4 to respectively allow voltage generation units 309b and 309c to generate core voltages $V_{DD\_CORE}$. In other words, the voltage generation units 309b and 309c can share with voltage generation units 309a and 309d in a burden. Therefore, according to the system configuration of the motherboard 400 in FIG. 4, the lifespan of the power supply module 301 is longer than that of the power supply module 201.

In the embodiment, the operation mode of the power control module 301 is similar to that of the power control module 201, and it can be known by persons having ordinary skill in the art by analogy, and then it is not described for concise purpose.

To sum up, the power supply module provided by the invention mostly utilizes the switching unit to switch between a group of PWM signals for generating the core voltage needed by the AM2 CPU and the PWM signal for generating the core voltage needed by the AM2+ CPU according to the version signal provided by the CPU of the motherboard. Therefore, as for a motherboard supporting an AM2 CPU and an AM2+ CPU, no matter a CPU socket on the motherboard is used for receiving the AM2 CPU or the AM2+ CPU, the power supply module provided by the invention can obtain the maximum usage efficiency, and the manufacture cost of the motherboard supporting an AM2 CPU and e AM2+ CPU and having the power supply module also decreases.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A power supply module applied to a motherboard, the power supply module comprising:
    a pulse width modulation (PWM) controller controlled by a central processing unit (CPU) of the motherboard, wherein when the CPU operates, the PWM controller outputs a first PWM signal and a second PWM signal and determines whether to output a third PWM signal according to a state of a version signal provided by the CPU;
    a first voltage generation unit coupled to the PWM controller and providing a first core voltage for the CPU according to the first PWM signal;
    a switching unit coupled to the PWM controller and the CPU and allowing one of the second PWM signal and the third PWM signal to be outputted according to the state of the version signal, the switching unit comprising:
        a first transistor, wherein a gate electrode of the first transistor is used for receiving the version signal, a first drain/source electrode of the first transistor is coupled to a system voltage of the motherboard, and a second drain/source electrode of the first transistor is coupled to a reference voltage;
        a second transistor, wherein a gate electrode of the second transistor is coupled to the first drain/source electrode of the first transistor, a first drain/source electrode of the second transistor is used for receiving the second PWM signal, and a second drain/source electrode of the second transistor is coupled to the reference voltage;
        a third transistor, wherein a gate electrode of the third transistor is coupled to the first drain/source electrode of the first transistor, a first drain/source electrode of the third transistor is coupled to the system voltage of the motherboard, and a second drain/source electrode of the third transistor is coupled to the reference voltage;
        a fourth transistor, wherein a gate electrode of the fourth transistor is coupled to the first drain/source electrode of the third transistor, a first drain/source electrode of the fourth transistor is used for receiving the third PWM signal and is coupled to the second voltage generation unit, and a second drain/source electrode of the fourth transistor is coupled to the first drain/source electrode of the second transistor;
        a first resistance coupled between a memory voltage of the motherboard and the gate electrode of the first transistor;
        a second resistance coupled between the system voltage of the motherboard and the first drain/source electrode of the first transistor;
        a third resistance coupled between the first drain/source electrode of the first transistor and the reference voltage; and
        a fourth resistance coupled between the system voltage of the motherboard and the first drain/source electrode of the third transistor,
        wherein when the state of the version signal is the floating level, the first transistor and the fourth transistor are turned on, the second transistor and the third transistor are turned off, and the first drain/source electrode of the fourth transistor outputs the second PWM signal, and when the state of the version signal is the low level, the first transistor and the fourth transistor are turned off, the second transistor and the third transistor are turned on, and the first drain/source electrode of the fourth transistor outputs the third PWM signal; and
    a second voltage generation unit coupled to the switching unit and correspondingly providing the first core voltage or a second core voltage for the CPU according to the output of the switching unit.

2. The power supply module according to claim 1, wherein the state of the version signal is determined by the version of the CPU.

3. The power supply module according to claim 2, wherein when the CPU is an AM2 CPU, the state of the version signal is a floating level to allow the PWM controller to stop outputting the third PWM signal and allow the switching unit to output the second PWM signal.

4. The power supply module according to claim 2, wherein when the CPU is an AM2+ CPU, the state of the version signal is a low level to allow the switching unit to output the third PWM signal.

5. The power supply module according to claim 1, wherein each of the first transistor, the second transistor, the third transistor and the fourth transistor is an N-channel metal oxide semiconductor field effect transistor (MOSFET).

6. The power supply module according to claim 1, wherein the PWM controller is further used to output a fourth PWM signal and a fifth PWM signal.

7. The power supply module according to claim 6 further comprising:
- a third voltage generation unit coupled to the PWM controller and providing the first core voltage for the CPU according to the fourth PWM signal; and
- a fourth voltage generation unit coupled to the PWM controller and providing the first core voltage for the CPU according to the fifth PWM signal.

8. A motherboard comprising:
- a central processing unit (CPU); and
- a power supply module comprising:
  - a pulse width modulation (PWM) controller coupled to the CPU and controlled by the CPU, wherein when the CPU operates, the PWM controller outputs a first PWM signal and a second PWM signal and determines whether to output a third PWM signal according to a state of a version signal provided by the CPU;
  - a first voltage generation unit coupled to the PWM controller and providing a first core voltage for the CPU according to the first PWM signal;
  - a switching unit coupled to the PWM controller and the CPU and allowing one of the second PWM signal and the third PWM signal to be outputted according to the state of the version signal, the switching unit comprising:
    - a first transistor, wherein a gate electrode of the first transistor is used for receiving the version signal, a first drain/source electrode of the first transistor is coupled to a system voltage of the motherboard, and a second drain/source electrode of the first transistor is coupled to a reference voltage;
    - a second transistor, wherein a gate electrode of the second transistor is coupled to the first drain/source electrode of the first transistor, a first drain/source electrode of the second transistor is used for receiving the second PWM signal, and a second drain/source electrode of the second transistor is coupled to the reference voltage;
    - a third transistor, wherein a gate electrode of the third transistor is coupled to the first drain/source electrode of the first transistor, a first drain/source electrode of the third transistor is coupled to the system voltage of the motherboard, and a second drain/source electrode of the third transistor is coupled to the reference voltage;
    - a fourth transistor, wherein a gate electrode of the fourth transistor is coupled to the first drain/source electrode of the third transistor, a first drain/source electrode of the fourth transistor is used for receiving the third PWM signal and is coupled to the second voltage generation unit, and a second drain/source electrode of the fourth transistor is coupled to the first drain/source electrode of the second transistor;
  - a first resistance coupled between a memory voltage of the motherboard and the gate electrode of the first transistor;
  - a second resistance coupled between the system voltage of the motherboard and the first drain/source electrode of the first transistor;
  - a third resistance coupled between the first drain/source electrode of the first transistor and the reference voltage; and
  - a fourth resistance coupled between the system voltage of the motherboard and the first drain/source electrode of the third transistor,
  - wherein when the state of the version signal is the floating level, the first transistor and the fourth transistor are turned on, the second transistor and the third transistor are turned off, and the first drain/source electrode of the fourth transistor outputs the second PWM signal, and when the state of the version signal is the low level, the first transistor and the fourth transistor are turned off, the second transistor and the third transistor are turned on, and the first drain/source electrode of the fourth transistor outputs the third PWM signal; and
  - a second voltage generation unit coupled to the switching unit and correspondingly providing the first core voltage or a second core voltage for the CPU according to the output of the switching unit.

9. The motherboard according to claim 8, wherein the state of the version signal is determined by the version of the CPU.

10. The motherboard according to claim 9, wherein when the CPU is an AM2 CPU, the state of the version signal is a floating level to allow the PWM controller to stop outputting the third PWM signal and allow the switching unit to output the second PWM signal.

11. The motherboard according to claim 9, wherein when the CPU is an AM2+ CPU, the state of the version signal is a low level to allow the switching unit to output the third PWM signal.

12. The motherboard according to claim 8, wherein each of the first transistor, the second transistor, the third transistor and the fourth transistor is an N-channel metal oxide semiconductor field effect transistor (MOSFET).

13. The motherboard according to claim 8, wherein the PWM controller is further used to output a fourth PWM signal and a fifth PWM signal.

14. The motherboard according to claim 13, wherein the power supply module further comprises:
- a third voltage generation unit coupled to the PWM controller and providing the first core voltage for the CPU according to the fourth PWM signal; and
- a fourth voltage generation unit coupled to the PWM controller and providing the first core voltage for the CPU according to the fifth PWM signal.

* * * * *